(12) United States Patent
Zeiter et al.

(10) Patent No.: US 6,430,984 B2
(45) Date of Patent: Aug. 13, 2002

(54) PROCESS FOR MANUFACTURING SHAPED PACKAGING

(75) Inventors: Patrik Zeiter, Zürich; Heinz Oster, Feuerthalen, both of (CH)

(73) Assignee: Alcan Technology & Management Ltd., Neuhausen am Rheinfall (CH)

( * ) Notice: Subject to any disclaimer, the term of this patent is extended or adjusted under 35 U.S.C. 154(b) by 0 days.

(21) Appl. No.: 09/805,820

(22) Filed: Mar. 13, 2001

Related U.S. Application Data

(62) Division of application No. 09/379,451, filed on Aug. 23, 1999, now Pat. No. 6,269,671.

(30) Foreign Application Priority Data

Sep. 16, 1998 (CH) .............................................. 1889/98

(51) Int. Cl.[7] ........................ B21D 11/10; B65D 83/04
(52) U.S. Cl. ..................................... 72/379.4; 206/531
(58) Field of Search .................................. 206/531, 539; 53/453, 467, 475; 72/347, 349, 379.4

(56) References Cited

U.S. PATENT DOCUMENTS

| | | | | |
|---|---|---|---|---|
| 4,562,719 A | * | 1/1986 | Budrean et al. | 72/349 |
| 4,889,236 A | * | 12/1989 | Bartell et al. | 206/531 |
| 4,914,937 A | * | 4/1990 | Bulso, Jr. et al. | 72/349 |
| 5,879,612 A | * | 3/1999 | Zeiter et al. | 264/292 |
| 6,055,794 A | * | 5/2000 | Breitler | 53/453 |

* cited by examiner

Primary Examiner—Ed Tolan
(74) Attorney, Agent, or Firm—Bachman & LaPointe, P.C.

(57) ABSTRACT

Process for manufacturing cold formed shaped packaging having at least one recess made from a metal-plastic laminate 20. Examples of such shaped forms of packaging are the base parts of push-through packs or blister packs. The process is such that the laminate 20 is held between a retaining tool 5 and a die 1. The die 1 exhibits at least one opening 8 and a stamping tool 6 is driven into the die opening 8 causing the laminate to be shape-formed into the said packaging and, correspondingly, exhibiting one or more recesses. The die 1 and the retaining tool 5 exhibit facing edge regions 11,12, and within the edge region 11 the die 1 exhibits a shoulder region 13 that surrounds the die opening 8 or openings 8. The surface of the shoulder region 13 lies 0.01 to 10 mm lower than the surface of the edge region 11 of the die 1. A first stamping tool with low-friction shape-forming surface forms the metal-plastic laminate in one or more steps down to 100% of the final depth of the recess and subsequently the same or a second stamping tool 6 likewise with low-friction shape-forming surface effects the final forming of the pre-formed laminate 20 in one or more steps to at least 100% of the final depth of the recess.

16 Claims, 4 Drawing Sheets

Figur 1
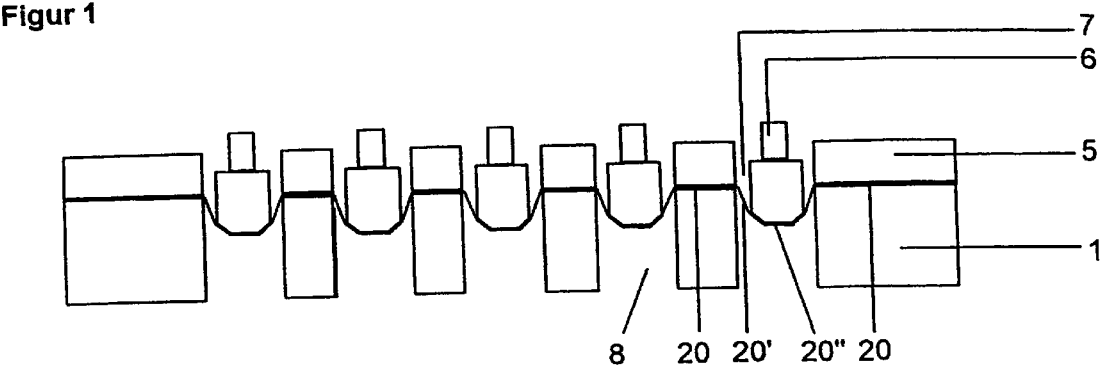
Figur 2
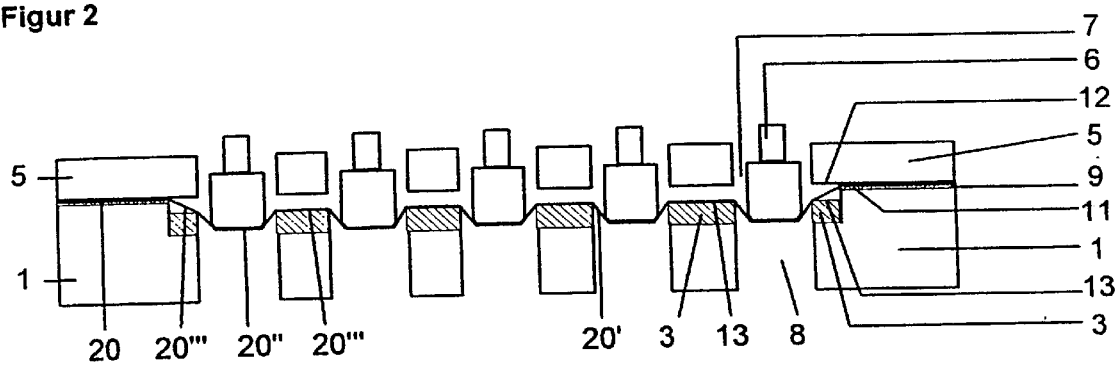
Figur 3
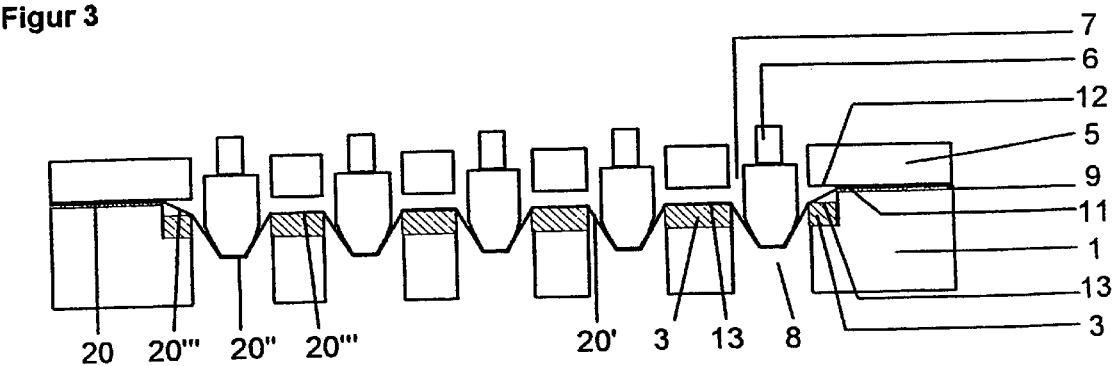

Figur 4
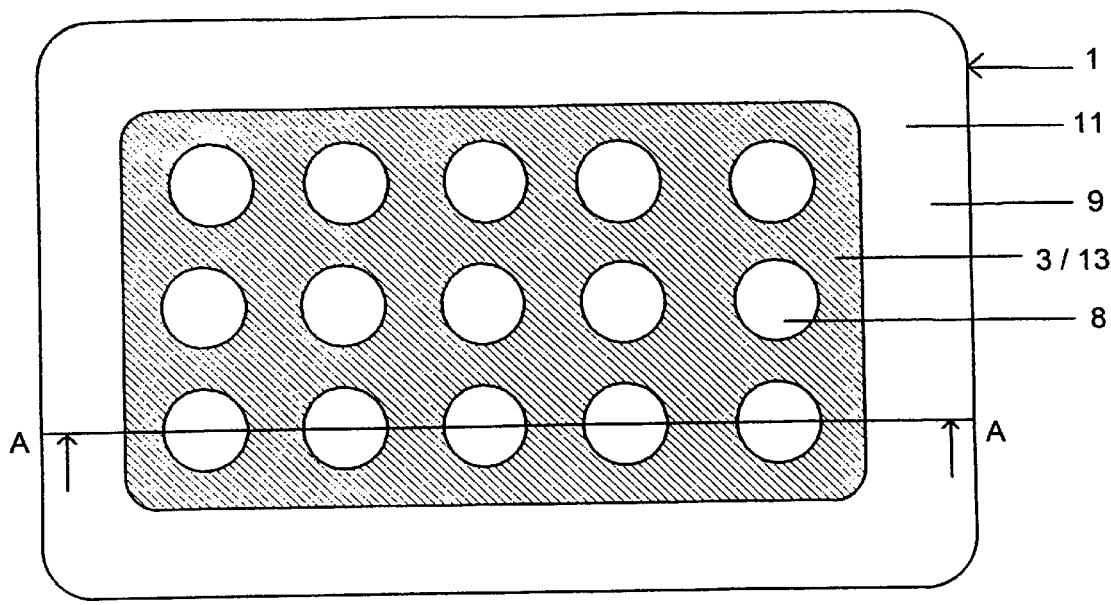
Figur 5
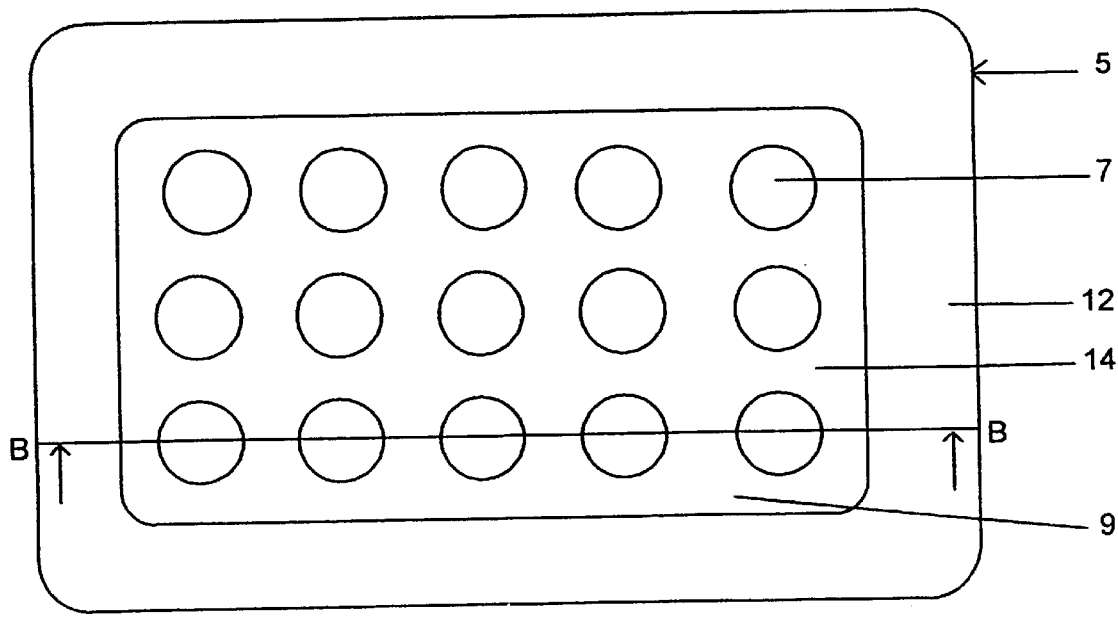

Figur 6
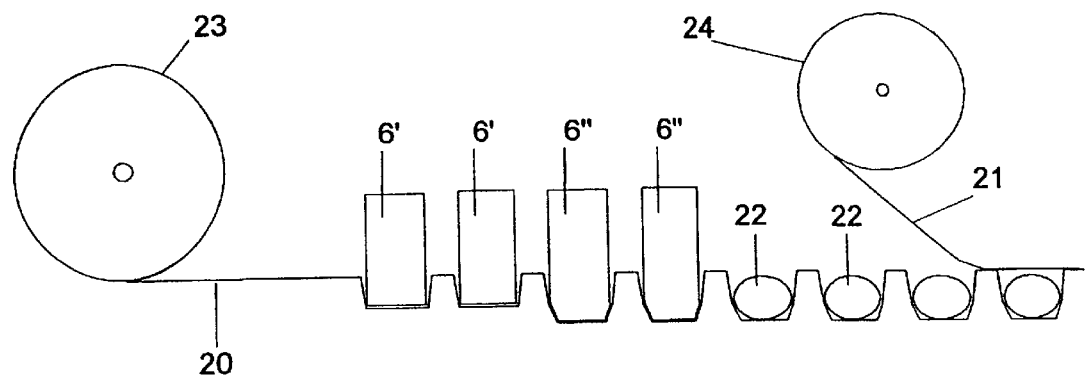
Figur 7
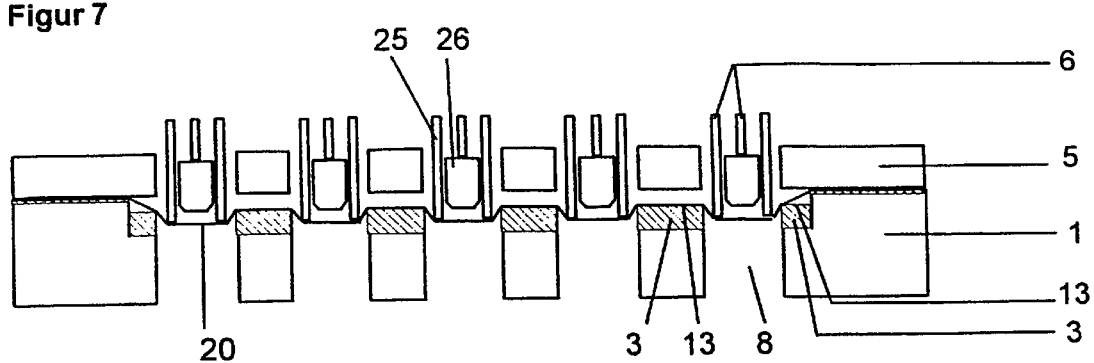
Figur 8
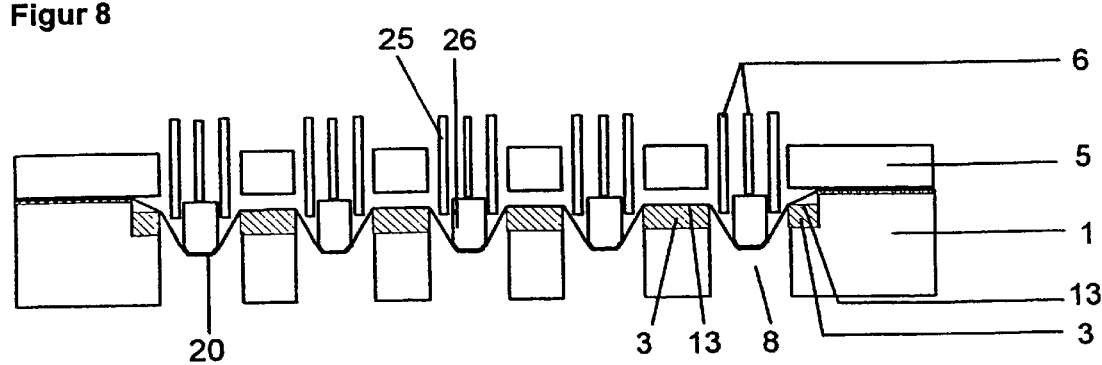

PROCESS FOR MANUFACTURING SHAPED PACKAGING

This application is a divisional of Ser. No. 09/379,451, now U.S. Pat. No. 6,269,671 filed Aug. 23, 1999.

The present invention relates to a process for manufacturing cold-formed shaped packaging from a metal plastic-laminate in which the laminate is held between a retaining tool and a die exhibiting at least one opening, and a stamping tool is driven into the die opening causing the laminate to be formed into shaped packaging with one or more recesses, the die and the retaining tool each exhibit a facing edge region, the die features within the edge region a shoulder region that surrounds the die opening or openings and the surface of the shoulder region lies lower than the edge region of the die. The present invention relates also to a device for performing the process of cold forming a metal-plastic laminate into shaped packaging, and relates also to cold formed packaging.

It is known to manufacture shaped packaging such, for example base parts for blister packs, also known as push-through packs, or other packaging containers e.g. by deep drawing, stretch-drawing or thermoforming. The shaped packaging may be manufactured from thermoplastics or from composites or laminates such as e.g. aluminium foils laminated with plastic films or layers of thermoplastics laminated by means of extrusion.

If the shaped-packaging, made by shape-forming, is made from laminates containing metal foils, then shaping tools comprising a stamping tool, a die and a retaining tool may be employed for this purpose. During deformation the laminate is clamped securely between the die and the retaining tool, then the stamping tool moved towards the laminate. As it is lowered, the stamping tool penetrates deeper into the openings in the die thereby deforming the laminate. The flat, laminate is converted into a shaped part exhibiting one or more recesses which are surrounded by shoulders corresponding to the original flat plane of the laminate. Only that part of the laminate in the region of the die opening can flow or be stretched to form a shaped part. In order that the laminate, especially laminates containing metal foil, can be deformed without creating cracks and pores, adequate lateral distance must be maintained between the stamping tool and the die opening. Cold forming a laminate containing a metal foil by this process enables recesses of only small side wall height to be achieved. This results in poor drawing ratios i.e. shallow recesses of large diameter and, therefore, forms of packaging which are too large in relation to the contents.

One possibility for obtaining more laminate for deformation purposes in order to achieve larger wall heights, may be to reduce the retaining force and to employ deep drawing methods. However, as folds would form in the edge or shoulder regions, this type of technology may not be used e.g. for making blister packs from laminates containing metal foil. The edge region and, if desired, the shoulder region of shaped forms of packaging is normally employed for sealing the lid into place. If there are folds present there, then the edge and the shoulders could not be sealed.

The European patent application EP 0 779 143 A1 describes a process for manufacturing such shaped packaging in which a metal-plastic laminate is held securely between a retaining tool and a die featuring one or more openings while two or more stamping tools drive the laminate into the die openings, thereby forming the laminate into shaped packaging with recesses. The process described there consists of two steps. In the first step use is made of a stamping tool that exhibits a high degree of friction in contact with the surfaces effecting the shaping. This causes the laminate to be pre-formed in one or more sub-steps. In a second step a second stamping tool is employed for further shape forming. This stamping tool exhibits a lower degree of friction on the surfaces effecting the shape forming. Using this tool the laminate is shape-formed into its final shape in a series of sub-steps.

The object of the present invention is to provide a process which enables shaped packaging, or shaped parts free of folds, to be made from metal-containing laminates by means of cold forming whereby the degree of forming and size of wall height are an improvement over the state-of-the-art.

That objective is achieved by way of the invention in that a first stamping tool or first stamping tools with a low-friction forming surface pre-form the metal-plastic laminate in a first step up to 100% of the final depth of the recess and, subsequently in a second step, using the first stamping tool or second stamping tool or tools of low-friction forming surface, the pre-formed metal-plastic laminate is shaped up to at least 100% of the final depth of the recesses.

The low degree of friction may be expressed by the dimensionless numbers according to the method 311A in BS 2782. The friction of the stamping tool with respect to the forming surface of the stamping tool is preferably 0.05 to 2.1 e.g. the first or the second and the second tool or second tools for the first and second shaping steps exhibit, at least on the shape-forming surface, different degrees of friction in the region concerned, or the stamping tools exhibit the same friction values.

The first stamping tool or tools may have different geometries from the second stamping tool or tools.

In a preferred version of the invention the first stamping tool or tools is/are driven in a first step down to 90%, usefully to 70% and advantageously to 50% of the final depth of the recesses, and subsequently in a second step the same first stamping tool or tools or a second stamping tool or tools is/are driven down to 100–115%, advantageously to 103–110% of the final depth of the recesses.

The first step, as with the second step, may independent of each other, be divided into two or more strokes of the stamping tool using the same or different tools.

In the present invention the various stamping tools are advantageously employed one after the other and, via pre-forming, each stamping tool is lowered—in a series of steps down maximum depth—into the die opening by the same amount or further than the preceding tool. The metal-plastic laminate springs back, therefore at least the last forming step must exceed the full, i.e. 100% desired depth of deformation.

Usefully, the stamping tools with low-friction forming surface employed in the first step are cylindrical, blunted cone, blunted pyramid or barrel shaped. The stamping tools employed for the second step have the shape of a cone, pyramid, blunted cone, blunted pyramid, segment of a sphere or cap. The stamping tools for the first step feature in particular vertical or steep side walls, and the edges or periphery at the bottom of the tool has a small radius. The stamping tool for the second step with a low-friction forming surface, may be vertical or exhibit sloping side walls, and the transition to the bottom of the stamp may be round or roundish in shape. In the present process the stamping tool or tools, in particular the first tools for the first shaping step, may exhibit between the base of the stamping tool and its side wall an edge radius R of e.g. 0.3 mm to 1.5 mm, preferably 0.5 mm to 1.2 mm. It has also been found useful to vary the geometry of the shape-forming surface of the successive tools. A favourable version in this respect is to gradually increase the value of the edge radius R between the stamping tool base and its side wall on proceeding from the first to the second stamping tool i.e. to round the edges more. Instead of an edge radius R one may introduce in several steps a transition involving conical or blunted cone shaped tools.

It has been found particularly advantageous for a first forming step to employ a first stamping tool having an edge radius R between the tool base and tool side wall of 0.1 mm to 5.0 mm, preferably 0.5 mm to 5.0 mm and a second forming tool for the second forming step having a multi-step conical or blunted cone transition from stamping tool side wall to stamping tool base.

The process according to the invention may be performed e.g. using a die and retaining tool and two or more stamping tools which are lowered one after the other into the openings in a die then raised again. The first and second stamping tools may exhibit on the surfaces effecting forming, the same or different degrees of friction, in each case in the above mentioned region. For pre-forming a first stamping tool e.g. with low-friction forming surface is employed for the first step; this tool is withdrawn and then in the second step the same stamping tool performs the final shape-forming in the same die. For the pre-forming one may e.g. also employ a stamping tool with a low-friction shape forming surface; this tool is withdrawn and a the final shape-forming performed by a second stamping tool, likewise with a low-friction shape-forming surface, introduced into the same die or into a second die after displacing the pre-formed laminate. It is also possible to employ three or more stamping tools with low-friction forming surfaces and this with the same or two different surface geometries or gradually different surface geometries.

In another version the process may be performed such that the stamping tools are arranged coaxial or telescopically inside each other. A first stamping tool with a low-friction forming surface which is ring-shaped in plan view, can effect pre-forming by lowering it into the die. The first stamping tool may be left in the pre-forming position and a second cylindrical-shaped stamping tool, which slides telescopically in the first ring-shaped stamping tool and exhibits a low-friction forming surface, is then lowered effecting the final forming of the laminate. Such stamping tools may be made up of two or more ring-shaped stamping tools and an innermost cylindrical stamping tool all of which slide telescopically inside each other. The degrees of friction of the individual tool surfaces effecting forming may lie in the given range or exhibit the same numerical value.

In another version the process may be performed in such a manner that several dies, in particular two dies with retaining tools, are arranged one after the other and with a stamping tool appointed to each die. Working at a given rhythm the laminate is preformed in a first step in the first die, then the pre-form displaced and in a second step shaped to its final form in the second die. It is also possible to perform the pre-forming in two or more steps and to divide the final shaping operation into two or more steps, with the result that the total number of steps in the process is three, four, etc.

The recesses formed out of the area of laminate material may be cup-shaped, dish-shaped, cap-shaped, barrel-shaped, cylindrical etc. As viewed in plan view, the recesses may be round, oval or polygonal, such as two, three, four, or more cornered. Preferred are recesses with steep to vertical side walls which are as straight as possible and bases which are as domed as little as possible. The recesses are surrounded by a, normally flat, shoulder area of laminate material.

A preferred form of the die is such that the surface of the die shoulder region lies 0.05 to 2 mm, preferably 0.15 to 0.3 mm lower than the surface of the edge region of the die.

The device according to the present invention may contain a die with one or more openings.

Usefully, the device, and therefore the die, exhibits 1 to 200 die openings, preferably 8 to 40 die openings. The deformation of the metal-plastic laminate is effected by at least one stamping tool, which can as such penetrate a die opening. If the die features several openings, then the stamping tool may exhibit a support or support plate or holder plate or the like with a corresponding number of shaping heads attached to it. The stamping tools or shaping heads are dimensioned such that they can penetrate the die openings, forming the metal-plastic laminate in the process. Usefully, the diameter of the stamping tool or shaping heads is 3 to 35% smaller than the diameter of the related die opening, preferably 1 to 15% smaller and in particular 5 to 10% smaller. By the diameter of the stamping tool or shaping head or die opening in the case of a non-circular cross-section—such as a convex cross-section e.g. elliptic, oval, polygonal, rectangular, trapezium-shaped, rhomboid shaped etc.,—is meant the smallest diameter.

As a rule, the walls of the openings in the die stand at an angle of 90° to the surface of the shoulder region. The edges that the wall of the opening and the surface of the shoulder region form with each other may be rounded with a radius e.g. of 0.1 to 10 mm, usefully 0.1 to 1 mm.

In another preferred version the edge regions of the retaining tool and the die are each 1 to 100 mm wide, usefully 2 to 30 mm and preferably 3 to 20 mm.

The die exhibits the edge region and, within this edge region, the shoulder region. The die openings are arranged in particular symmetrically or also asymmetrically within the shoulder region with the shoulder region forming struts that surround the die openings.

The shoulder region of the die is such that the distances between the edge region of the die and the die openings and between the individual openings are 1 to 50 mm, preferably 5 to 25 mm.

The edge region of the retaining tool or the edge region of the die, or the edge regions of the die and the retaining tool, may exhibit a roughness pattern over part or the whole of the surface there. Typical roughness patterns are corrugations, waffle patterns, embossed patterns, honeycomb patterns, knobs, tooth-like patterns, roughened surfaces etc. Instead of or in addition to the roughness pattern, peripheral strips e.g. of an elastic material such as rubber and the like may be employed.

In the working position the edge regions of the retaining tool and the die usefully lie against the metal-plastic laminate and, if desired with the aid of the roughness pattern, hold the laminate in place such that it cannot be stretched. The shoulder region of the die usefully lies a distance from the parts of the retaining tool facing it; in this region the metal-plastic laminate does not make contact with the retaining tool, and the metal-plastic laminate can be stretched or made to flow according to the degree to which the stamping tool is lowered.

The shoulder regions of the die may be covered wholly or partly with a layer that, at least on the surface, exhibits a low degree of friction. A low degree of friction here means values of 0.05 to 2.1 (dimensionless number), as measured according to method 311A, British Standard 2782. The low friction layer may e.g. contain or be of plastics such as polytetrafluorethylene, polyoxymethylene (polyacetal POM), polyethylene or polyethylene-terephthalate. The low friction layer may also exhibit in mixture form two or more of the plastics mentioned by way of example or one or more of the plastics in mixture form along with hard substances in divided form such as glasses in spherical form. Instead of plastics, other materials may be considered for the low friction layer. This means, for example, metals such as aluminium or chromium steel, especially with polished surfaces. Other low friction layers such as ceramic layers or layers containing graphite, boron nitride or molybdenum disulphide may be employed. The thickness of the low friction layer on the shoulder of the die is not critical as only the surface is of consequence. Under industrial conditions the layer is subjected to large demands with regard to frictional forces and so preference should be given to a thickness that permits some degree of material loss. For that reason the thickness of layer of the above mentioned plastics may be e.g. from 0.5 to 20 mm. The layer of plastic may be inserted in the lowered region of the die as a pre-form, or it may be deposited by spraying, brushing, wiping or some other method of deposition. The plastics may also be deposited for example in a matrix of other materials such as ceramic or metal. Metal layers may be deposited e.g. using chemical or physical methods such as electroplating or electrolytic deposition, plating or vapour deposition in vacuum, or the die may be made, at least in part, of the metals in question.

Stamping tools with low friction surfaces effecting forming comprise as a rule of a retaining device such as a clamping plate and a number of stamping tool heads. Advantageously, the number of stamping tool heads corresponds to the number of die openings. The stamping tool heads penetrate the corresponding opening in the retaining device and the openings in the die.

Stamping tools with low friction surfaces effecting forming are usefully such that at least the shape-forming surface, i.e. the surface of the stamping tool or the shaping heads coming into contact with the laminate, exhibits a low degree of friction. By a low degree of friction in the present case is meant friction values—according to method 311A, British Standard 2782—of e.g. 0.05 or less to 2.1 (dimensionless number). At least the low friction surface may contain or be e.g. of metals such as steel, or plastics such as polytetrafluorethylene, polyoxy-methylene polyacetal, (POM), polyethylene-terephthalate, polyethylene, rubber, hard rubber or caoutchoucs, including acrylic polymers. The surfaces of metals may be given the properties to achieve low friction values e.g. by polishing. The stamping tools feature polytetrafluorethylene (Teflon) at least on the shape-forming surfaces. The low friction layer may also exhibit in mixture form two or more of the plastics mentioned by way of example or one or more of the plastics in mixture form and, additionally in divided form, hard substances such as glasses in spherical form. Instead of plastics, other materials may be considered for the low friction layer. This means, for example, metals such as aluminium or chromium steel, especially such with polished surfaces. Other low friction surface layers such as ceramic layers or layers containing graphite, boron nitride or molybdenum disulphide may be employed.

Metal-plastic laminates that may be used are e.g. laminates containing a metal foil which is 8 to 150 μm thick, preferably 20 to 80 μm thick. The foil may be e.g. of steel, iron, copper and preferably aluminium. Included are also metal foils of alloys containing mainly one of the above mentioned metals. Preferred aluminium foils may e.g. be aluminium having a purity of at least 98.0%, usefully 98.3%, advantageously 98.5% and especially 98.6%, the remainder making up the 100% being the accompanying impurities. Further, aluminium foils e.g. of the type AlFeSi or of the AlFeSiMn type may be employed.

The plastics used may be e.g. layers, films or laminates, whereby the foils and laminates may also be oriented, or, in other words, uniaxially or biaxially stretched, be of thermoplastics of the polyolefin, polyamide, polyester, polyvinyl-chloride type and other types.

Typical examples of thermoplastics of the polyolefin type are polyethylenes such as MDPE, DPE, uni-axially, or biaxially stretched polyethylenes, polypropylenes such as cast polypropylene and uni-axially or biaxially stretched polypropylenes or polyethylene-terephthalate from the polyester series.

The thickness of the thermoplastic in the metal-plastic laminates, whether as layer, film or laminate, may be e.g. 12 to 100 μm, preferably 20 to 60 μm.

The metal foils and thermoplastics may be converted into a laminate e.g. by adhesive bonding, calandering or extrusion adhesive bonding. In order to join the layers, adhesives and bonding agents may be applied as required and the surfaces to be joined may be modified by a pre-treatment involving plasma, corona or flame treatment methods.

Examples of metal-plastic laminates are laminates having as a first layer e.g. a film or laminate made up of the above mentioned thermoplastics, a second layer, in the form of a metal foil and, on the free side of the metal foil, a third layer—a sealing layer of a polyolefin such as polyethylene or polypropylene or PVC.

Further useable metal-plastic laminates may exhibit a first layer e.g. a film or film-laminate of the above mentioned thermoplastics, a second layer in the form of a metal foil, and a third layer, for example a film or film-laminate or an extruded layer out of one of the above mentioned thermoplastics. Further layers such as sealing layers may be provided.

The metal-plastic laminates may feature a sealing layer in the form of a sealable film or a sealable coating at least on one of the outer lying sides, or on both outer sides. The sealing layer is of necessity the outermost layer in the laminate. In particular the sealing layer may be on one outer side of the laminate, and should be directed towards the contents or shoulder side of the shaped packaging, this in order to enable the lid foil or the like to be sealed into place.

Typical examples of metal-plastic laminates used in practice are:

oPA 25 /Al 45 / PVC 60,
oPA 25 /Al 45 / oPA 25,
Al 120 / PP 50,
oPA 25 / Al 60 / PE 50,
oPA 25 / Al 60 /PP 60,
oPA 25 / Al 45 / PVC 100,
oPA 25 / Al 60 / PVC 60,
oPA 25 / Al 45 / PE-coated,
oPA 25 / Al 45 / oPA 25,
oPA 25 / Al 60 / PVC 100,
oPA 25 / Al 60 / oPA 25 / EAA 5O,
PVC 60 / oPA 25 / Al 60 / PVC 60,
PVC 60 / oPA 15 / Al 45 / oPA 15 / PVC 60,
PVC 60 / oPA 25 / Al 45 /oPA 25 / PVC 60,
oPA 25 / Al 60 / oPVC 30,
oPA 25 / Al 60 / oPVC 60,
oPET 25 / Al 60 / oPVC 30, oPA 25 / Al 60 / oPET 25,
oPET 25 / Al 60 / oPET 25,
where "o" stands for "oriented", PA for polyamide, PVC for polyvinylchloride, PE for poly-ethylene, PP for polypropylene, PET for polyethylene-terephthalate, EAA for ethyleneacrylic acid and Al for aluminium, and the numbers the thickness of the layer or foil in $\mu$m.

The present invention also relates to cold formed packaging manufactured by the process according to the invention where the forms of packaging are made e.g. from one of the above mentioned metal-plastic laminates.

The present invention relates also to the device for performing the process according to the invention in which the dies and the retaining tools exhibit facing edge regions which clamp the laminate between the edge of the die and the edge of the retaining tool such that it cannot stretch, and stamping tools which draw the laminate over the shoulders of the die into the die openings which lie within a shoulder region in the die, the surface of the shoulder region lying 0.01 to 10 mm lower than the edge region of the die, and the laminate slides or flows as it is drawn and/or stretched over the surface of the shoulder region.

Useful is a device for performing the process in which the surface of the shoulder region of the die lies 0.1 to 2.0 mm, preferably 0.15 to 0.3 mm lower than the surface of the edge region of the die.

Preferred is a device for performing the process in which the shoulder regions of the die are partially or wholly covered with a surface layer exhibiting a low friction value of 0.05 to 2.1.

Within the scope of the invention is the use of shaped packaging forms which have been cold formed by the process according to the invention, as container for accommodating individal items in the recesses. Examples of such items are e.g. one, two or three tablets, dragées, pills, ampoules etc. in each recess of a shaped form of packaging such as a blister pack or push-through pack.

The use of the shaped packaging according to the invention includes the individual accommodation of contents in the form of tablets, dragees, pills, capsules, or ampoules having a maximum diameter of 5 to 20 mm, preferably 7 to 10 mm with a maximum height of 1.5 to 10 mm, usefully 3 to 5 mm.

The process according to the invention may be employed for manufacturing, from metal-plastic laminates, cold formed packaging such as base and lid parts of blister packs for pharmaceuticals, foodstuffs and luxury consumables, technical articles, for bases and lids of semi-rigid and rigid packaging for enclosing purposes etc.

On thermoforming plastic films e.g. PVC into blister packs it is possible to achieve high side walls. Up to now, however, it has not been possible to achieve such high side walls on the recesses of shaped forms of packaging such as blister packs made from laminates containing metal foils. This means that the form of packaging that had to be used was much too large in comparison with the contents. It is now possible using the present process to produce shaped forms of packaging that do not exhibit the disadvantages experienced to date i.e. such as the low wall height compared to that achieved with thermoformed plastic films. With the present process it is now possible to manufacture shaped forms of packaging which with respect to size of packaging, are at least comparable. The packaging can therefore be designed to look more attractive and to have a better image from the ecological standpoint. At the same time the pore-free depth achieved by shape forming can also be improved.

Drawing ratios—i.e. a ratio of diameter to the depth of the recess formed—of e.g. 1.9 to 5 or preferably 2.1 to 2.6 can be achieved. The diameter of the recess, if not round in cross-section, is to be understood as the largest diameter i.e. in the case of non-circular cross-sections, such as a convex cross-section e.g. elliptical, oval, polygonal, rectangular, trapezium shaped, rhomboid etc.

The number of recesses in each base part is not critical and may e.g. be one, two or more. In pharmaceutical applications packs with 6 to 40 recesses are normal.

By cold forming is meant here forming at temperatures of e.g. 10 to 35° C., preferably 20 to 30° C.

The laminates that are processed into shaped forms of packaging such as blister packs and in particular the bases of blister packs remain pore-free even at high drawing ratios, and the reject rate due to forming is substantially reduced.

The present invention is explained in greater detail by way of example in FIGS. 1 to 10.

FIG. 1 shows in cross-section a device for manufacturing cold-formed blister packs according to the current state of the art.

FIGS. 2 and 3 show schematically in cross-section a device according to the invention in the two sequential steps of the process.

FIG. 4 shows in plan view a die for the device according to the present invention.

FIG. 5 shows a plan view of a retaining tool for the device according to the present invention.

FIG. 6 shows schematically a step in the process according to the present invention.

FIGS. 7 and 8 show schematically in cross-section a version of the device according to the invention in the two sequential steps of the process.

Figure 9:
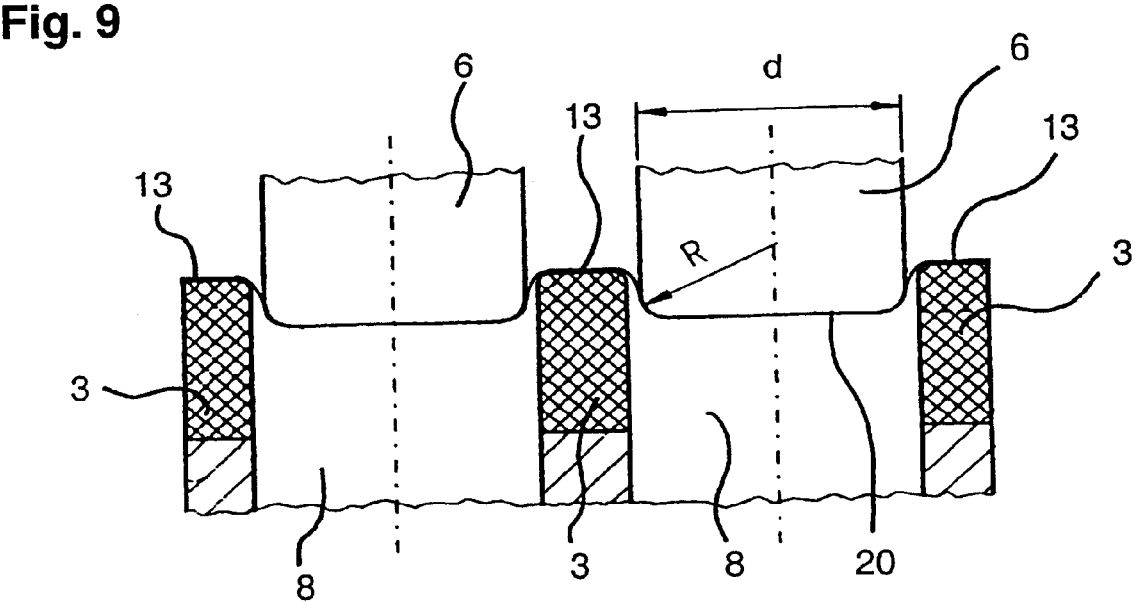
FIG. 9 shows a cross-section through a stamping tool used for example for shape forming during the first step.

FIG. 1 shows a state-of-the-art device comprising a die 1, a retaining tool 5 and a stamping tool 6. In the present case the stamping tool features a support (not shown) on which a number of stamping tool heads 6 is mounted. The number of stamping tool heads corresponds to the number of openings in the die 1. The stamping tools or the stamping tool heads 6 penetrate the opening 7 in the retaining tool. A metal-plastic laminate 20 is placed between the die 1 and the retaining tool 5. By applying force, the retaining tool 5 is pressed against the die 1, as a result of which the metal-plastic laminate 20 is held securely at all places of contact between the die 1 and the retaining tool 5, essentially unable to be stretched. The stamping tool heads 6 are lowered under the application of force and enter the openings 7 in the retaining tool, press against the metal-plastic laminate 20" and—while deforming the metal-plastic laminate 20'—pass through the die openings 8 in the die, until the desired degree of deformation of the metal-plastic laminate has been achieved.

The metal-plastic laminate is held both in the edge region and in the shoulder region 13 between the retaining tool 5 and the die 1, essentially unable to be stretched, and the deformation of the laminate effected solely within the metal-plastic laminate material covering the die opening 8.

In FIGS. 2 and 3 the process according to the invention is shown in two stages; the device—illustrated here in cross-section—shows the die 1, the retaining tool 5 and the stamping tool (stamping tool heads) 6. The retaining tool 5 features an edge region 12; also the die 1 features an edge region 11. A roughness pattern 9 is provided in the edge region 11 of the die 1. With respect to the height of the edge region 11 of the die 1, the whole shoulder region 13 i.e. that region of die 1 located within the die region 11 and forming the shoulders surrounding the die openings, is lower than the edge region 11 of the die 1.

A layer 3, shown shaded in FIGS. 2 and 3, is provided in the shoulder region 13 of the die 1. Layer 3 is a layer of a low friction material such as e.g. polytetrafluorethylene, polyoxymethylene, polyolefins or polyethyleneterephthalate etc. Advantageously, layer 3 extends over the whole shoulder region 13 of the die 1. A layer 3 which only covers part of the shoulder region 13 is possible in some cases.

A metal-plastic laminate 20 is shape-formed in the device according to the invention. The metal-plastic laminate 20 may be introduced into the device in the form of an endless strip from a supply roll or in sheet form. The different parts of the metal-plastic laminate that undergo different degrees of deformation are indicated by 20' 20" and 20'''. The metal-plastic laminate 20 is positioned, clamped between the retaining tool 5 and the die 1 and, especially in region 11 of the die 1 which is covered by the edge region of the retaining tool 5, is unable to be stretched. The stamping tool heads 6 are lowered under the application of force through the openings 7 in the retaining tool, and press against the metal-plastic laminate 20". While deforming the metal-plastic laminate, the stamping tool heads 6 are lowered through the openings 8 in the die until the desired degree of deformation of the metal-plastic laminate has been reached. The metal-plastic laminate 20''' in the whole of the shoulder region 13 i.e. along the edge regions and the shoulders between the die openings 8, is able to flow and is deformed by stretching according to the extent to which the stamping tool 6 is lowered into the die openings 8. In addition, the metal-plastic laminate 20' between the shoulder region and the stamping tool 6 is deformed by stretching. The surface of the stamping tool heads 6 exhibiting a low degree of friction and are to advantage cylindrical or barrel shaped. This means that the periphery or edges between the base and side wall of the stamping tool are of small radius and the side wall of the stamping tool forms a steep angle or is vertical to the base of the stamping tool. The deformation is performed until e.g. up to 100% of the final depth of the recess has been reached.

The second stage in the process according to the invention is shown in FIG. 3. There is no essential difference with respect to the die 1, retaining tool 5, openings 7 and 8, the roughness pattern 9, the edge region 11, the edge region 12 and the shoulder region 13 as far as the device is concerned. In the second stage of the process other stamping tool heads 6 are lowered into the. die openings 8 thus deforming the metal-plastic laminate 20 further until the desired degree of deformation of the laminate has been achieved. The metal-plastic laminate 20''' can flow and be stretched further in the whole of the shoulder region 13 i.e. along the edge regions and the shoulders between the die openings 8 and to an extent according to the amount to which the stamping tool heads 6 are lowered into the die openings 8. Also the metal-plastic laminate 20' between the shoulder region and the stamping tool heads 6 is stretch-formed further. A stamping tool with e.g. a head 6 which has a blunted cone cross-section is employed for the second stage of the process. The surface of the stamping tool heads 6 effecting forming exhibits low friction characteristics. Consequently, also the metal-plastic laminate 20" in the region of the surface of the stamping tool effecting forming is able to flow. The shape-forming operation is performed e.g. at least until the final depth i.e. at least up to 100% of the required depth of the recess has been reached.

FIG. 4, a plan view of a die 1, shows the edge region 11 and the shoulder region 13. The edge region 11 may feature a roughness pattern 9. The shoulder region 13 lies 0.01 to 10 mm lower than the edge region 11. In an advantageous version the shoulder region 13, is partly and especially fully covered with the described low friction deposit or layer 3. The die openings 8 are shown by way of example in a regular array in the shoulder region 13. As a rule these are holes i.e. openings or recesses that are round in cross-section or openings that are oval in cross-section. Also openings that are polygonal in cross-section e.g. rectangular, square or six-sided may be created without any difficulty.

A retaining tool 5 is shown in plan view in FIG. 5. The surface 14 of the retaining tool 5 which faces the die and comes to rest on the laminate during manufacture may be flat. In the production stage the laminate is securely clamped across the areas of contact with the edge region 12 of the retaining tool 5 and the edge region 11 of the die 1, and viz., such that the laminate can not stretch or flow there. Instead of a flat surface the retaining tool 5 may also feature an edge region 12 and lower region within the edge region, or the retaining tool 5 may essentially comprise only of the edge region i.e. a ring.

A roughness pattern may be provided over part or the whole of the surface in the edge region 12 of the retaining tool 5. Instead of or in combination with a roughness pattern it is possible to provide strips of an elastic material such as rubber etc., on the retaining tool such that these strips reinforce the clamping action. The edge region of the retaining tool 5 is usefully positioned in the same region as the edge region 11 of the die 1, and both edge regions have essentially the same dimensions.

The retaining tool 5 exhibits a plurality of openings 7 or recesses, in the present case openings. The openings 7 are penetrated by the stamping tools or stamping tool heads and, accordingly, the holes are arranged in the same position and are at least approximately the same size as the openings 8 in the die 1.

The lines A—A in FIG. 4 and B—B in FIG. 5 are the lines of cross-section through the die 1 and retaining tool 5 shown in FIGS. 2 and 3.

The process according to the present invention is shown simplified and schematically in FIG. 6. A metal-plastic laminate 20 is uncoiled from a roll 23 and fed to a first stamping tool with heads 6', then to a second stamping tool with heads 6". Recesses are thereby pressed into the metal-plastic laminate 20 in two stages. The result is a shaped form of packaging to which the contents 22 are then added. Thereafter, a lid foil 21 may be continuously uncoiled from a roll 24 and sealed or the like onto the shaped packaging. The endless packaging strips can then be cut to the desired pack sizes.

Shown in FIGS. 7 and 8 is a further version of the process according to the invention taking place in two stages; the device which is illustrated in cross-section shows the die 1, the retaining tool 5 and the stamping tool 6. Further details and their notation are as shown in FIGS. 2 and 3. A layer 3 is provided in the shoulder region 13 of the die 1. In FIGS. 7 and 8 the layer 3 is shown shaded and is the layer of low friction material, known from FIGS. 2 and 3. FIG. 7 shows the first step in the process. The metal-plastic laminate 20 is shape-formed by the stamping tools 6 which make up a unit and are in e.g. two parts. A hollow, cylindrical stamping tool 25, which in plan view is ring-shaped and has a low friction forming surface, is lowered and pre-forms the metal-plastic laminate 20. As shown in FIG. 8, the final shape-forming of the metal-plastic laminate 20 takes place in the second stage. A cylindrical stamping tool 26 slides telescopically inside stamping tool 25 which in FIG. 7 has reached its lower end position where it remains. The stamping tool 26 slides telescopically out of stamp 25 and is lowered beyond stamping tool 25. As a result, the stamping tool 26 with its low friction forming surface deforms the metal-plastic laminate 20 advantageously up to and beyond the desired 100% depth of formation.

FIG. 9 shows a single stamping tool 6 or two stamping tool heads 6 that may be mounted on a common support plate, which is not shown here. An edge with edge radius R is provided between the base and the side wall of the stamping tool. The stamping tool 6 is of diameter d, which is e.g. 3 to 30% smaller than the diameter of the die opening 8. During the shape-forming process, the metal-plastic laminate 20 is braced against and slides over the shoulder region 13. The stamping tools 6 of the type shown are preferably suited for preforming and for the final shaping operation.

Figure 10:
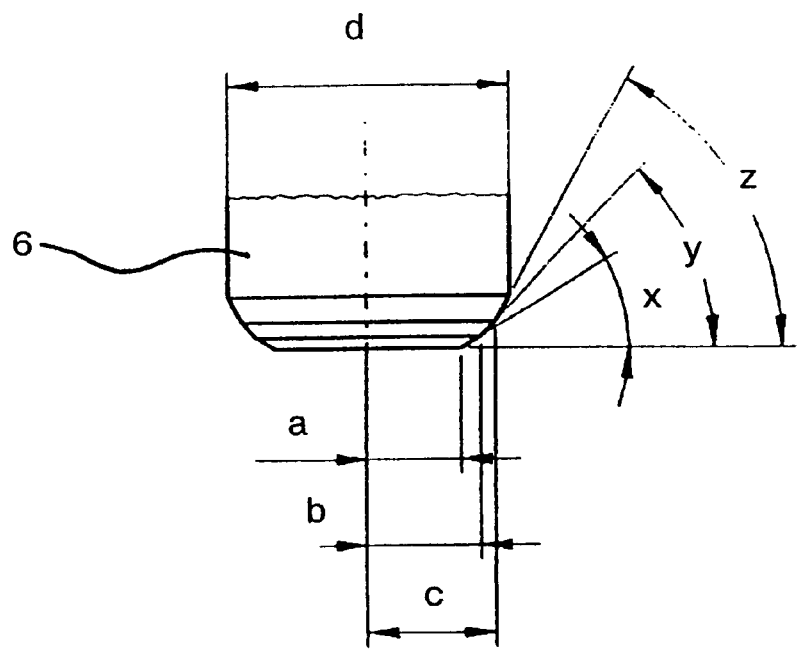
FIG. 10 shows a preferred exemplified version of a second stamping tool for final shaping purposes.

FIG. 10 shows a version of stamping tool 6 preferred for the final shaping operation. The transition from the base to the side wall of the tool has a radius that changes gradually in steps. The tangents to the individual steps may e.g. form angles x, y, z of 30° to 75° with the base of the tool. The radius a may e.g. be at least 60% of d/2, where d represents the diameter of the stamping tool. Accordingly, the radii b and c are larger than a and smaller than d/2.

In the example illustrated here a relatively small die is shown. It is also possible to design dies according to the present invention with the shoulder region subdivided by transverse and/or longitudinal struts. The metal-plastic laminate is held, clamped securely in place by the retaining tool in the region of these struts. This enables a plurality of shaped forms of packaging to be produced e.g. with one die and one stroke of the stamp. After the shaping process, the shaped packs that are produced simultaneously may be separated e.g. at dividing lines along the struts.

The process according to the process is especially suitable for contents that are flat in shape. The contents may be in the form of tablets, dragees, pills, capsules, ampoules etc. One advantage hereby is that the process according to the invention also makes it possible to achieve a steeper side wall in the recess. This leads to improved drawing ratios and therefore to smaller packaging with respect to the size of the contents. Calculations for cylindrical shaped contents approx. 9 mm in diameter and approx. 3.5 mm in height show that the shaped packaging can be made about 35% smaller using the process according to the invention.

What is claimed is:

1. Container, which comprises a container of a metal-plastic laminate with at least one recess therein, said container for holding contents in the form of individual items and manufactured by the following process:

holding the laminate between a retaining tool and a die exhibiting at least one opening; driving a stamping tool into said at least one die opening causing the laminate to be formed into a shaped form of packaging featuring one or more recesses; wherein the die and the retaining tool exhibit a facing edge region and within the edge region the die features a shoulder region which surrounds said at least one opening in the die and the surface of the shoulder region lies lower than the surface of the edge region of the die; and wherein at least one first stamping tool including a low-friction forming surface pre-forms the metal-plastic laminate in a first step up to 100% of the final depth of the recesses, and subsequently in a second step at least one of (1) said at least one first stamping tool and (2) at least one second stamping tool including a low-friction forming surface, shape-forms the pre-formed metal-plastic laminate to at least 100% of the final depth of the recesses.

2. Container according to claim 1, holding at least one of tablets, dragees, pill, capsules and ampoules having a maximum diameter of 5 mm to 20 mm and a maximum height of 1.5 to 10 mm.

3. Container according to claim 2, wherein said maximum diameter is 7 to 10 mm and said maximum height is 3 to 5 mm.

4. Container according to claim 1, wherein the shape-forming surfaces of at least one of the first stamping tool and the second stamping tool exhibit a friction value of at least 0.05 and at most 2.1.

5. Container according to claim 1, wherein for the first and second step the same stamping tool is employed and the shape-forming surface of the stamping tools exhibits a friction value of at least 0.05 and at most 2.1.

6. Container according to claim 1, wherein the first stamping tool and the second stamping tool employed for shape forming exhibit the same friction values.

7. Container according to claim 1, wherein the first stamping tool has a different geometry from that of the second stamping tool employed for shape forming.

8. Container according to claim 1, wherein the first stamping tool effects a pre-forming of up to 90% of the final depth of the recesses and subsequently in the second step, at least one of the first stamping tool and the second stamping tool effect the final shape-forming by up to 100 to 115% of the final depth of the recesses.

9. Container according to claim 1, wherein said at least one first stamping tool for the first step exhibits an edge radius R of 0.1 mm to 5.0 mm.

10. Container according to claim 1, wherein said at least one first stamping tool for the second step exhibits a multi-stage, conical shaped transition from the base to the side wall of the stamping tool.

11. Container according to claim 1, wherein the laminate is held by a die and a retaining tool and the laminate is shape-formed by means of at least two stamping tools that slide inside one another in a telescopic manner and are lowered one after the other into the openings in a die.

12. Container according to claim 1, wherein a ring-shaped first stamping tool is lowered and pre-forms the metal-plastic laminate in the die and remains there in the preforming position, and a second cylindrical-shaped stamp which slides telescopically inside said first stamping tool is then lowered and effects the final forming of the metal-plastic laminate.

13. Container according to claim 1, wherein the laminate is held by means of a die and a retaining tool and a first and a second stamping tool are lowered one after the other into the opening in a die then raised again causing the laminate to be pre-formed then finally shaped.

14. Container according to claim 13, wherein said first and second stamping tools feature different geometries.

15. Container according to claim 1, wherein two dies with their retaining tools are arranged one after the other, and each die has a stamping tool appointed to it, and the laminate is moved in a fixed-cycle operation from the first die to the second die, and the laminate is pre-formed in the first die, and the pre-formed laminate moved to the second die, and given the final shape forming in the second die.

16. Container according to claim 1, wherein several dies with their retaining tools are arranged one after the other, and each die has a stamping tool appointed to it, and the laminate is moved in a fixed-cycle operation from the first die to a following die, and in the first step the laminate is pre-formed in at least one die, and the pre-formed laminate moved to the following die, and in the second step given the final shape forming in at least one other die.

* * * * *